United States Patent

Seidenfaden

[15] 3,681,834

[45] Aug. 8, 1972

[54] METHOD AND APPARATUS FOR FABRICATING WORKHOLDERS

[72] Inventor: Heinz Seidenfaden, Varel, Oldenburg, Germany

[73] Assignee: Vereinigte Flugtechnische Werke-Fokker GmbH, Breman, Germany

[22] Filed: Jan. 26, 1970

[21] Appl. No.: 5,497

[30] Foreign Application Priority Data

Jan. 24, 1969 Germany..........P 19 03 576.8

[52] U.S. Cl. ..................29/200 J, 29/200, 29/200 P, 29/407, 29/573

[51] Int. Cl. ..........................................B23p 19/00

[58] Field of Search..........29/407, 573, 200 P, 200 J, 29/200, 200 P, 200 S

[56] References Cited

UNITED STATES PATENTS

| | | | |
|---|---|---|---|
| 3,197,844 | 8/1965 | Bassett | 29/573 |
| 3,216,101 | 11/1965 | Miller | 29/407 |
| 3,468,024 | 9/1969 | Yonkers | 29/407 |

*Primary Examiner*—John F. Campbell
*Assistant Examiner*—Donald P. Rooney
*Attorney*—Spencer & Kaye

[57] ABSTRACT

A method and apparatus for fabricating a holder for a workpiece from modular holding units. The number and location of the modular units is first determined by placing templates representing the modules onto a locating hole system layout having a uniform rectangular grid on its surface. The grid represents a uniform rectangular grid of holes in a plate to be attached to a machine tool. Once the exact number, configuration, and location of the modules needed to fabricate a work holder for particular workpiece has been determined, the actual modules represented by the templets are fastened onto the plate having the rectangular grid of holes in the same location as the templets on the layout. The modules may take many shapes; and both tensioning and clamping work holders can be fabricated.

11 Claims, 31 Drawing Figures

*Inventor:*
Heinz Seidenfaden
BY Spencer & Kaye
ATTORNEYS

Inventor:
Heinz Seidenfaden

BY Spencer & Kaye
ATTORNEYS.

Inventor:
Heinz Seidenfaden

BY Spencer & Kaye
ATTORNEYS.

*Inventor:*
Heinz Seidenfaden

BY Spencer & Kaye
ATTORNEYS.

Inventor:
Heinz Seidenfaden
BY Spencer & Kaye
ATTORNEYS.

INVENTOR.
Heinz Seidenfaden
BY Spencer & Kaye
ATTORNEYS

INVENTOR.
Heinz Seidenfaden
BY Spencer & Kaye
ATTORNEYS

METHOD AND APPARATUS FOR FABRICATING WORKHOLDERS

BACKGROUND OF THE INVENTION

The present invention relates to a method for the constructive development of a fixing and tensioning system for work pieces to be mechanically processed, e.g. on a machine tool, and apparatus for accomplishing the same.

Previously a construction drawing had to be made for each tensioning or holding device for a workpiece to be processed, and the device was then produced according to this drawing and was fastened with clamping bolts to the machine stand. Such devices can not be used for any other purposes after the production run has been completed. Tensioning devices are known which have a wider range of application and which are put together, in the manner of building blocks, from standardized components. Assembling and disassembling such devices is very time-consuming however, so that such devices can be used only for the manufacture of prototypes.

SUMMARY OF THE INVENTION

It is an object of the present invention to develop a construction and tensioning system which makes possible, without any additional means the assembling of a tensioning device from standardized modules. This approach permits rapid disassembly and re-use of the modules for components having other configurations.

The present invention achieves this object by providing a locating hole receiving plate, which is to be attached directly to the machine stand or to a plate fastened to the machine stand and which is provided with bores for fastening components, e.g. apparatus modules or workpieces, which bores are disposed at uniform coordinate distances. A locating hole system plan is prepared which represents, for example, a hole layout indicated by quarter circles corresponding to that of the locating hole receiving plate and on which the outlines of the components to be attached, e.g. module units, are marked as to their exact positions by templets in the sense of the use of the bores in the locating hole receiving plate. Recesses, bores, longitudinal slots and the like are provided for determining the position and indicating the drawing position of center markings, receiving studs, tensioning and locating prisms, abutment and tensioning surfaces or path limitations.

Additional templets can be used to fix the position of additional supporting or tensioning points.

It is not necessary to prepare a construction drawing for the tensioning device, rather, schematic representations by means of templets are sufficient. The templets are placed on a drawing indicating only the hole layout of the locating hole receiving plate, and are there outlined at the suitable location. Thus, the time consumed for the construction of the holding device, or fixture, is substantially reduced. The tensioning device in question can be mounted without much delay in an exact position in a combination consisting of module units. This achieves rapid positioning of the workpiece with respect to the tool, or tools, of the machine tool.

The advantages of the present method are immediately apparent. The process permits rapid and exact positioning, and assembly and disassembly does not require much time. The device can then be used for other purposes.

It is a particular advantage of the present invention that dead times and, hence, production costs, particularly those attributed to preparation and incidental hours, can be reduced and the machine tool can be more efficiently utilized.

DESCRIPTION OF THE PREFERRED EMBODIMENTS

Figure 1:
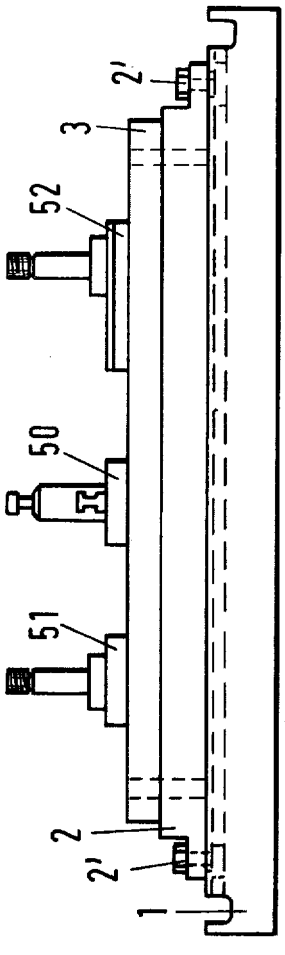
FIG. 1 shows a front elevation view of a tensioning system with receiving means for the workpieces to be processed.

FIG. 1 shows the machine stand 1 of a machine tool to which a plate 2 is fastened by means of screws 2'. This plate 2 holds a further plate 3 which is provided with bores 6, which are numbered $a_1$ to $f_9$ consecutively, disposed at uniform coordinate intervals. Plate 3, called a "locating hole receiving plate" bears module units 50, 51, 52, 34, 35, which are fastened to it by means of suitable screws (not shown) and with the use of a certain number of the bores 6. One of the module units 50, which is shown in FIGS. 18 to 21, is provided with a square base plate 50' and a post 33 which is mounted in an opening 122 so as to be pivotal around the center point of the plate 50', as well as a hole 33' through which a supporting bridge 34 is brought (see FIGS. 18 and 20). The base plate 50' is provided with a bore 8 in the vicinity of each of its four corners which bores are spaced in the same manner as the bores of the plate 3. Moreover, two further bores 16 are provided, which are each disposed between two bores 8 on opposite edges of plate 50' and may be used for fastening purposes if the plate 3 is provided with corresponding bores. The supporting bridge 34 is provided at its free end with a height-adjustable support 35 having a check nut 35'.

Figure 14:
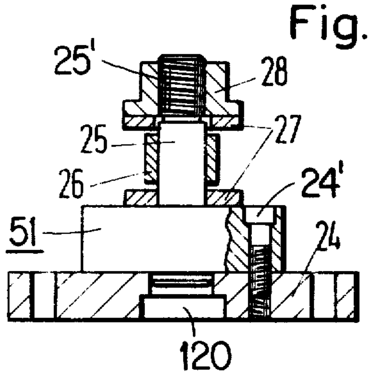
FIG. 14 is a front elevation view, partly in cross section, of a module unit used as the fixed point.
Figure 15:
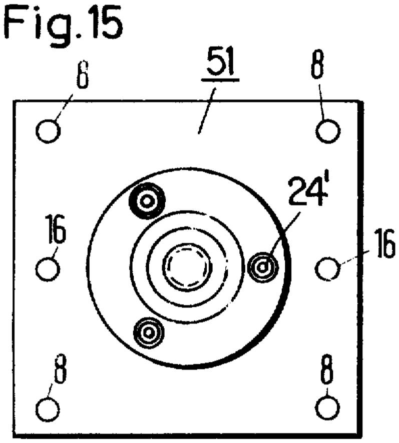
FIG. 15 is a top plan view of the module unit of FIG. 14.

A further module unit 51 is shown in FIGS. 14 and 15, and is provided with a base plate 24 having a bore spacing which corresponds to that of the module unit 50. In the center of the base plate 24 there is provided an exchangeable receiving stud 25, mounted in an opening 120. A disc 27, an intermediate sleeve 26 and a further disc 27 can be accommodated on stud 25. At the upper portion of the stud 25 there is located the beginning of a screw thread 25' to which, for example, a tensioning means 28 is screwed. The receiving stud 25 is fastened to the base plate 24 by means of suitable screws 24'.

Figure 16:
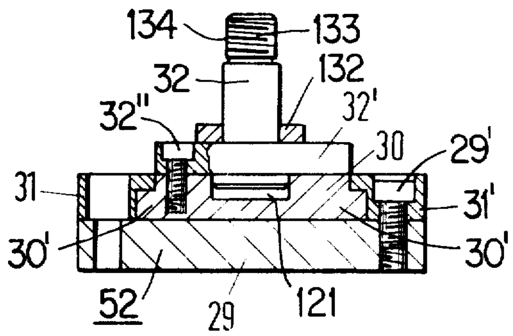
FIG. 16 is a front elevation view, partly in cross section, of an adjustable module unit.
Figure 17:
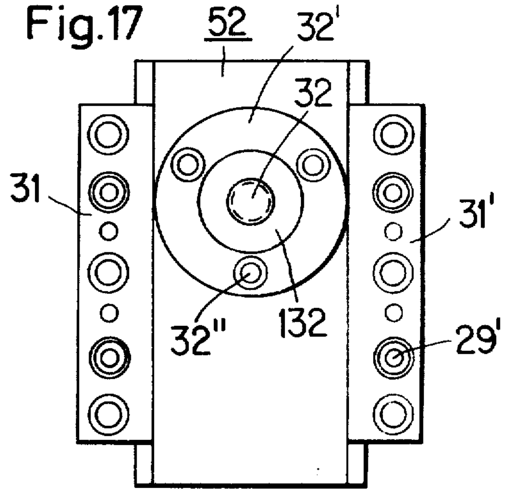
FIG. 17 is a top plan view of the module unit of FIG. 16.
Figures 18, 19:
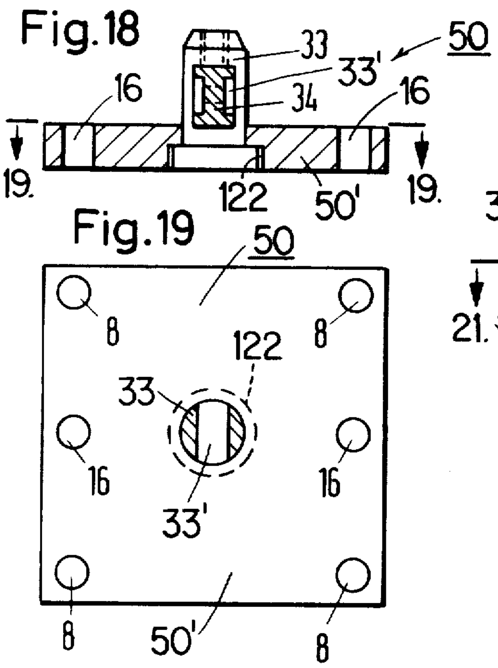
FIG. 18 is a cross-sectional front elevation view of a module unit pivotal around its center point.
FIG. 19 is a cross-sectional view taken generally along line 19—19 of FIG. 18.
Figure 20:
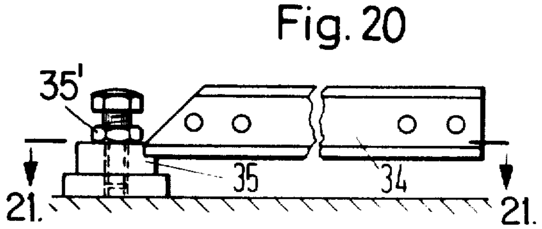
FIG. 20 is a front elevation view of a supporting unit.
Figure 21:
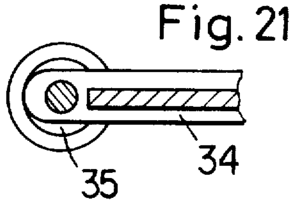
FIG. 21 is a partial cross-sectional view taken generally along line 21—21 of FIG. 20.

Another module unit 52 is shown in FIGS. 16 and 17 and is provided with a base plate 29 having a bore spacing corresponding to that of module units 50 and 51. The base plate 29 is provided with a pair of lateral guide ledges 31, 31' which are fastened thereto by means of suitable screws 29'. The guide ledges 31, 31' guide a pusher member 30 by means of protrusions 30'. A stud 32 is mounted in an opening 121 in pusher 30 by means of a plate member 32' and suitable screws 32''. A tensioning member 133 is fastened on stud 32 by, for example, screw threads 134. Due to the eccentric arrangement of the receiving stud 32 on member 30, it is possible to double the adjustment path by turning the unit 52 180°. The various elements are retained in their selected positions by merely tightening down the screws.

Figures 22, 23:
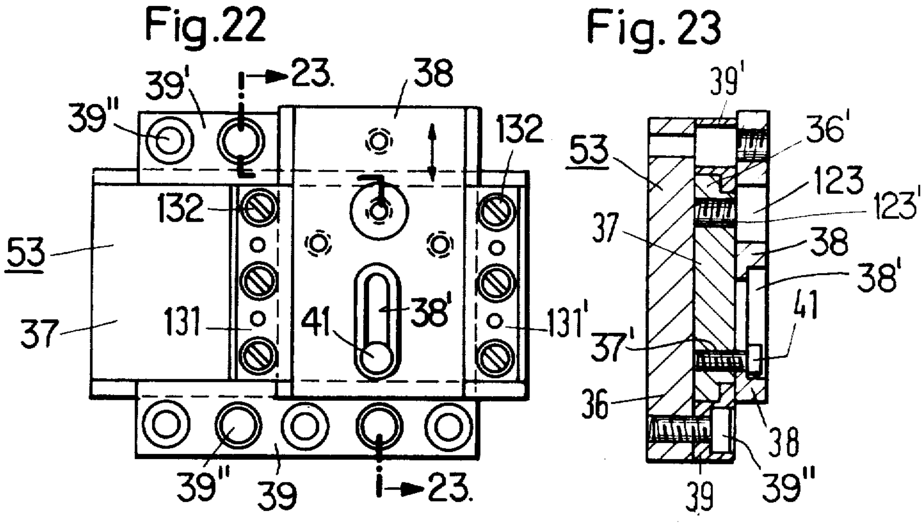
FIG. 22 is a top plan view of a module unit which can be adjusted in two perpendicular directions.
FIG. 23 is a cross-sectional view taken generally along line 23—23 of FIG. 22.

Yet another module unit 53 is shown in FIGS. 22 and 23 and is provided with a base plate 36 having a bore spacing corresponding to module units 50, 51 and 52. An intermediate plate 37, which can be moved on the base plate 36 is guided by lateral guide ledges 39, 39' acting on protrusions 36'. Guides 39, 39' are fastened to the base plate 36 by means of suitable screws 39''. The intermediate plate 37 is provided with an eccentrically located, threaded bore 37' to receive a threaded guide stud 41. A cross-bar pusher 38 having a longitudinal slot 38' for the guide stud 41 is displaceably mounted on the intermediate plate 37 and guided by lateral guide ledges 131, 131', fastened to plate 37 by suitable screws 132, so as to be movable in a direction of the arrows, i.e. transverse to the longer dimension of plate 37. This cross-bar pusher 38 is provided with a central bore 123 and 3 threaded fastening holes 123' for receiving an exchangeable receiving stud, such as stud 25.

The path of movement of the cross-bar pusher 38 is limited by the length of the longitudinal slot 38' and guide stud 41. By turning either the unit 53 or the pusher 38 180°, it is possible to achieve a path of movement which is twice as long. Due to the selected arrangement of two displaceable elements, the unit can be adjusted in two coordinate directions. As in unit 52, the various elements are retained in their selected position by tightening the screws.

Figure 24:
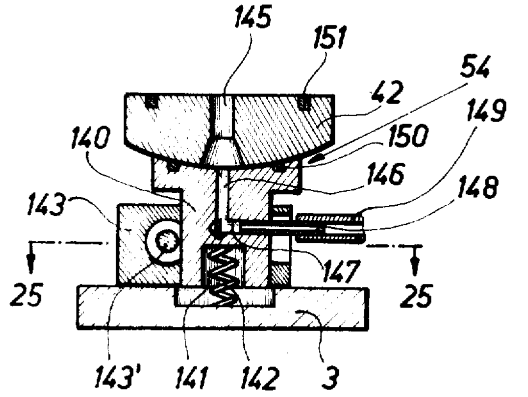
FIG. 24 is a cross-sectional view taken generally along the lines 24—24 of FIG. 25, and showing a module unit for vacuum tensioning.
Figure 25:
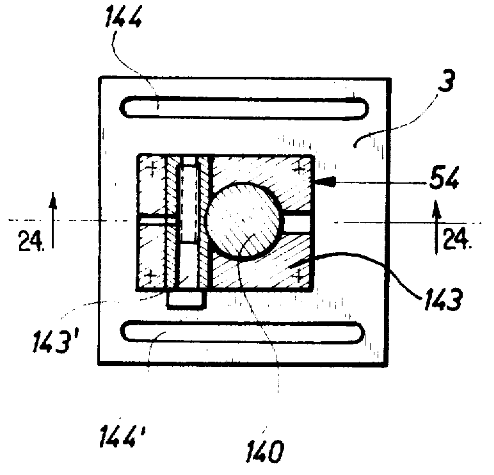
FIG. 25 is a cross-sectional view taken generally along the lines 25—25 of FIG. 24.

FIGS. 24, 25 show a module unit 54 which is fastened by a suitable bolt in slots 144 and 144' in base plate 3 to a receiving plate or pallet. A bearing stud 140 can slide with its head on a bore, the head bearing a pivoting subatmospheric pressure tensioning plate 42 which is provided with a conventional ball seat. The bearing stud 140 is provided with a center bore 141 which retains a spring 142 supported against the plate 3. A split clamp 143 with a clamping screw 143' serves to fix the position of the height-adjustable unit.

The vacuum is applied to the workpiece through a center bore 145 in the pressure tensioning plate 42. Bore 145 leads to a bore 146 and a transverse bore 147 in stud 140. Bore 147 connects to a pipe 148, which is in turn connected to a vacuum hose 149. Vacuum hose 149 may be connected to any suitable, known vacuum source. The upper surface of the bearing stud 140 has an arcuate shape which seats the arcuate bottom portion of pressure tensioning plate 42. A ring seal 150 seals between stud 140 and plate 42, and a ring seal 151 seals between the plate 42 and the workpiece.

The method of designing and fabricating the workholders will now be set out.

Figure 4:
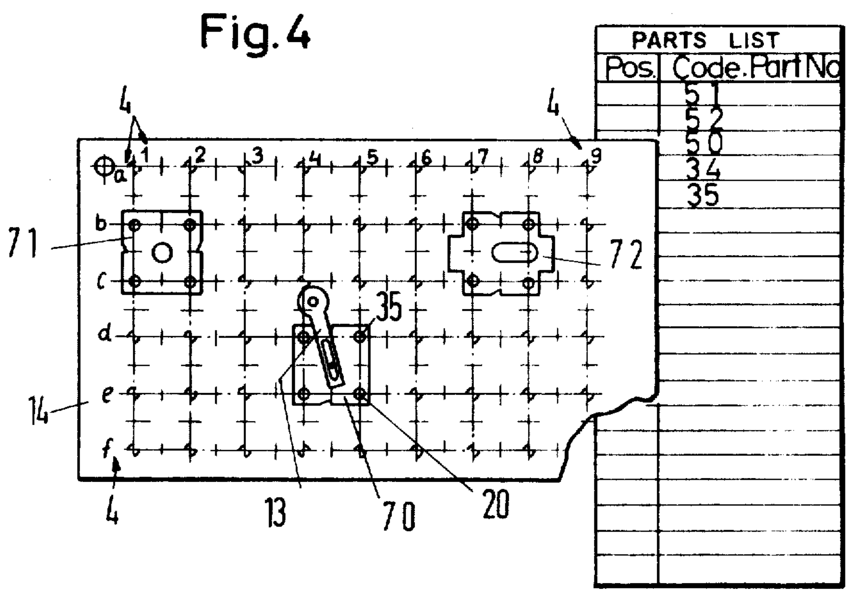
FIG. 4 schematically shows a locating hole system layout with structural units marked by templet outlines, and a parts list.
Figure 5:
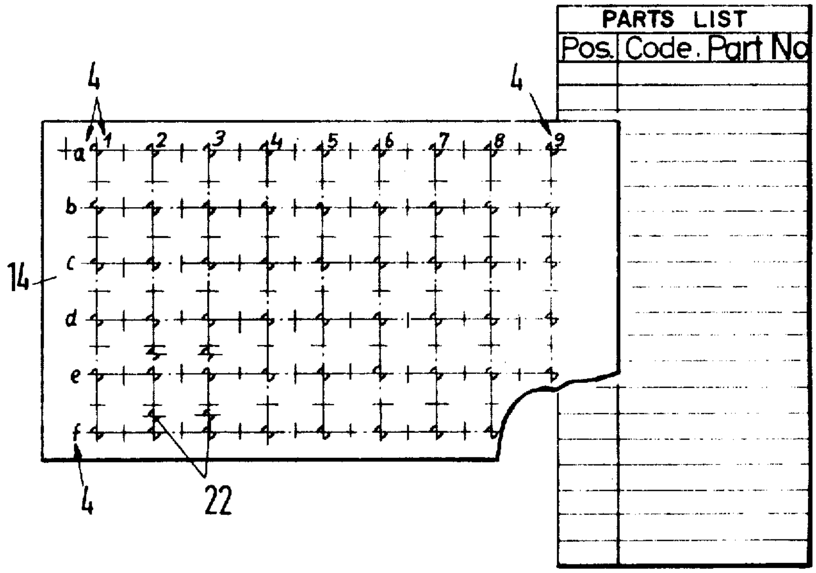
FIG. 5 schematically shows a system layout similar to that of FIG. 4 with an indication of intermediate bores.
Figure 7:
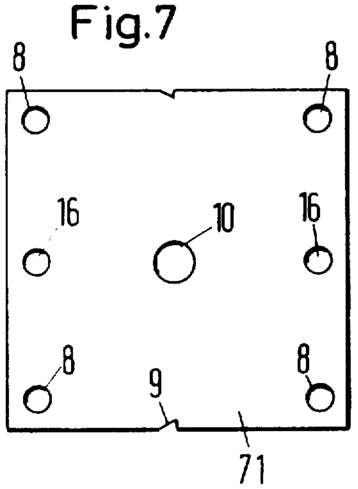
FIG. 7 schematically shows a templet for a locating point module unit.
Figure 8:
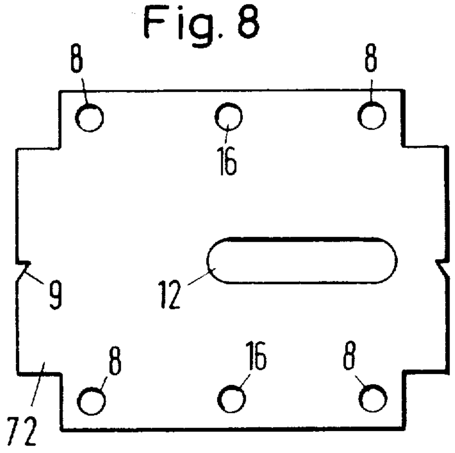
FIG. 8 schematically shows a templet for an adjustable module unit.
Figure 9:
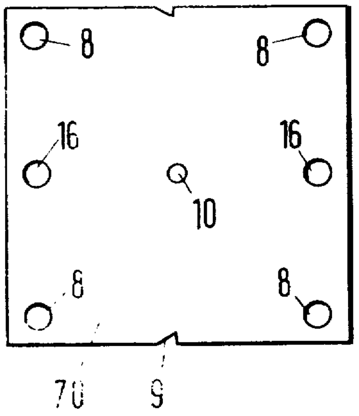
FIG. 9 schematically shows a basic templet for a module unit which can be pivoted around its center point.
Figure 10:
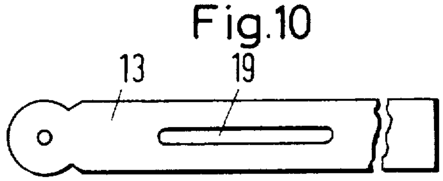
FIG. 10 schematically shows an additional templet.

In a locating hole system layout 14 (FIG. 4) whose locating hole system 4 coincides with the system 4 of the plate 3 with respect to the coordinate distances, the arrangement of the locating holes $a_1$ to $f_9$, for fixing the position and for the placement of templets 7, 13 are shown by quarter circles. The hole division of the locating hole system can be multiplied by intermediate bores 22 as shown in FIG. 5. In order to represent the module units 50, 51, and 52 in the drawing as well as the supplemental units 34, 35 in the locating hole system layout 14, the basic templets 70 (FIG. 9), the templets 71, 72 (FIGS. 7, 8) and the supplemental templet 13 (FIG. 10) may be used, whose hole spacing 8, 16 correspond to the fastening bores of the module units. Hole 10 is the center hole. First, for example, the position of the module unit 51, which is used as the fixed point, is determined by the application of templet 71 (FIG. 7) with respect to the locating holes in question. The hole spacing schedule of the templet must coincide with the corresponding quarter circles of the layout 14. Then the contours of the templet 71 are determined by outlining it. Next, the templet 72 (FIG. 8) is used for module unit 52, which is a unit adjustable in one coordinate direction and in which the exchangeable receiving stud 32, due to its offset arrangement, results in twice the path of adjustment when the unit is turned by 180°, and the above procedure is repeated. To account for this adjustment, the templet 72 is provided with an offset longitudinal slot 12 in the adjustment direction to determine the constructive and drawing position of unit 52 and to illustrate the adjustment path.

Figure 11:
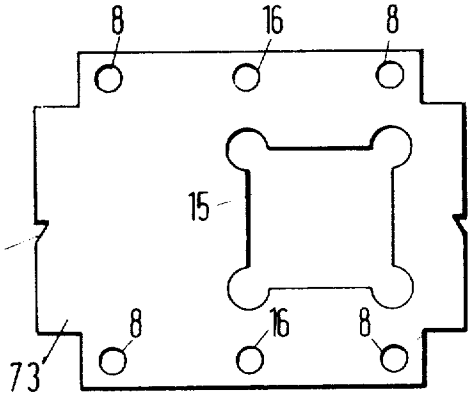
FIG. 11 schematically shows a templet for a module unit which can be adjusted in two perpendicular directions.

Comparable to the unit 52, which can be adjusted in one coordinate direction, the unit 53, which can be adjusted in two coordinate directions, can be represented by a templet 73 (FIG. 11). Templet 73 is provided with a rectangularly-shaped opening 15, offset from the shorter centerline of the templet. The exact point of the center of the workpiece engaging element is located within the opening in the case of both templets 72 and 73.

The adjustment paths make possible the locating and tensioning of points which are disposed between the points of the locating hole system. They serve to compensate for tolerances and to equalize the changes in lengths, particularly of molded pieces, which occur during processing. The heat of the process is a major cause of the changes.

The illustrative representation of the module unit 50 in the locating hole system layout 14 is accomplished by means of the base templet 70, an addition thereto being the application of the supplemental templet 13 (FIG. 10) for the additional units 34, 35 in the center point 10 of the base templet 70. Slot 19 of templet 13 is used to adjust templet 13 with respect to templet 70.

Figure 12:
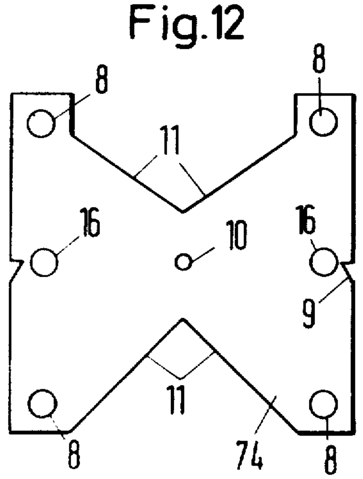
FIG. 12 schematically shows a templet for double-sided prism unit.
Figure 13:
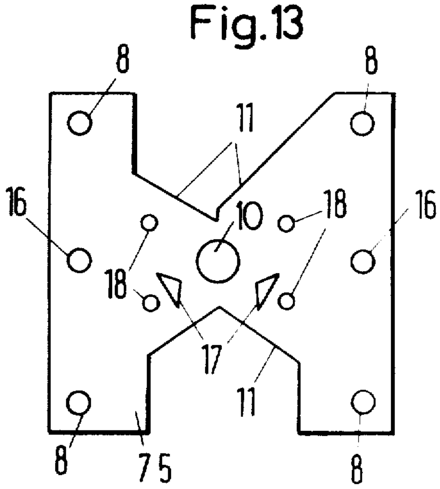
FIG. 13 schematically shows a templet for a pivotal prism unit.

A further embodiment of templets according to the present invention permits representation of the type of units 51, 52, 53 to be provided with two opposite prisms 11, such as templet 74 (FIG. 12) or an adjustable three-piece prism such as templet 75 (FIG. 13). Templet 75, which when pivoted about its center point can be attached in different ways, smaller triangular cutouts 17 and bores 18 being the fixable division possibility, makes possible a wider selection of suitable arrangements by using the suitable prism sizes. The additional cutouts as, for example, 11 or 17, recesses 9 and bores 10 at the templets are provided for position determination and illustration of further center markings, receiving studs and contact or tensioning surfaces which can be supplemented by additional templets to such an extent that receptacles, clamps and supporting elements, as well as bore and guide sleeve holders, can be drawn in their basic shapes on the locating hole system schedule 14.

Figure 26:
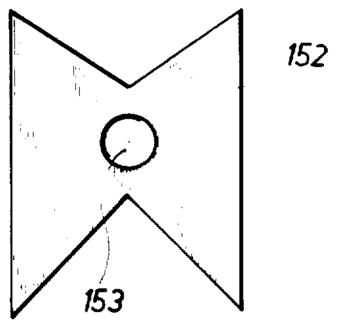
FIG. 26 is a top plan view of one embodiment of a module add-on element according to the present invention.
Figure 27:
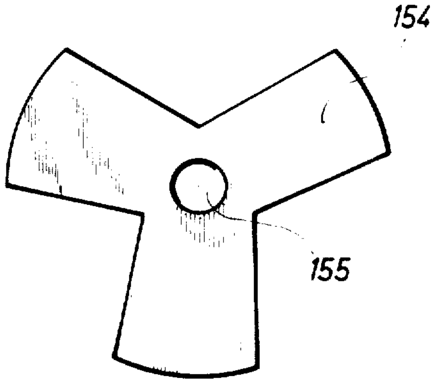
FIG. 27 is a top plan view of another embodiment of a module add-on element according to the present invention.

FIGS. 26 and 27 show plan views of module add-on elements that may be represented by templets 74 and 75, respectively. Element 152 is provided with two prism-shaped cutouts having different angles and a bore 153 to fit over a member such as stud 28 of module 51 (see FIG. 14). The element 154 (FIG. 27) is provided with 3 cutouts each offset by 120° from the other and defining different arcs, and provided with bore 155 to fit on a module member.

Instead of module units, it is also possible to represent templets on the locating hole system layout 14 utilizing the locating hole bores. The code numbers of the units are entered after determination of the constructional configuration in a parts list of system layout 14 (see FIG. 4).

The module or supplemental units are placed onto the locating hole receiving plate 3 according to the system layout and its schematic representation of the plate 3 and are fastened there by means of suitable screws (not shown).

Figure 6:
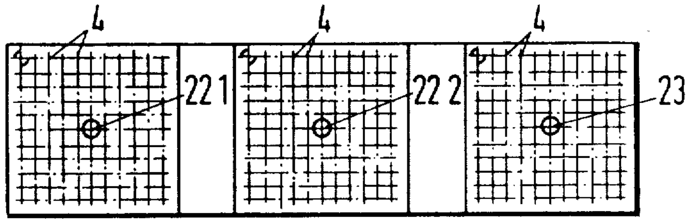
FIG. 6 is a schematic view of a layout for use of the system on a two-spindle duplicating milling machine.

When the system is used with a two-spindle duplicating milling machine (FIG. 6), the milling spindle axes 221, 222 and the duplicating key axis 23 must be disposed, in their zero position, above the respective centers of the locating hole system field, so that the arrangement of the units for the workpieces, as determined in the locating hole system layout 14, corresponds with the positioning of the templet, or the model, with respect to the spindle axes and the key axis.

Figure 2:
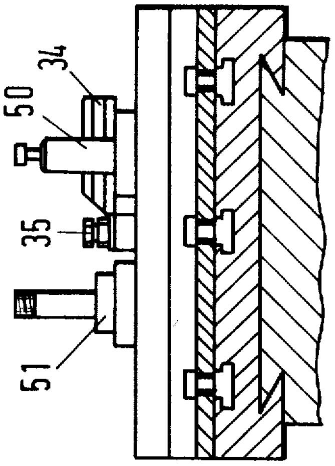
FIG. 2 is a side elevation view, partly in cross section, of the apparatus according to FIG. 1.
Figure 3:
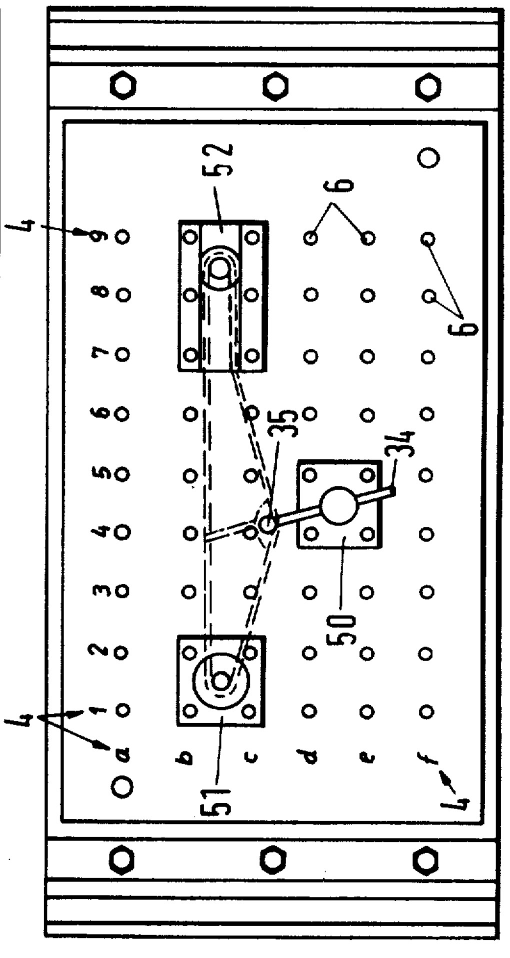
FIG. 3 is a top plan view of the apparatus according to FIGS. 1 and 2.

The machine stand 1 (FIGS. 1 to 3) may be directly provided with a locating hole system for receiving the module units and receiving plates; and the machine stand, the units and plates may be provided with a suitable vacuum clamping system. The above-mentioned module unit 54 (FIGS. 24, 25) may be attached to a workpiece when the vacuum clamping technique is employed, to serve as a pendulum vacuum tensioning unit, and may then be blocked, or sealed-off, where the tensioning plate 42 of unit 54 may be designed to be exchangeable and to have different configurations.

Figure 28:
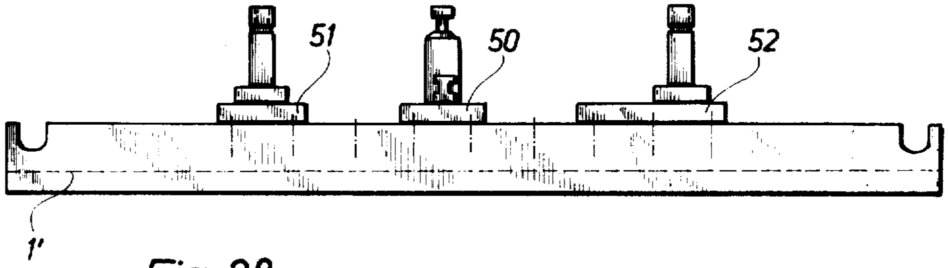
FIG. 28 is a front elevation view of a tensioning system according to the present invention, in which the module units are fastened directly to a machine tool table.
Figure 29:
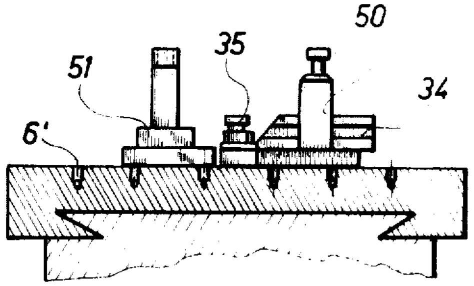
FIG. 29 is a side elevation view, partly in cross section, of the tensioning system shown in FIG. 28.
Figure 29A:
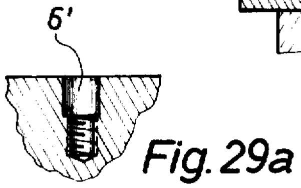
FIG. 29*a* is a cross-sectional view of a detail of FIG. 29.
Figure 30:
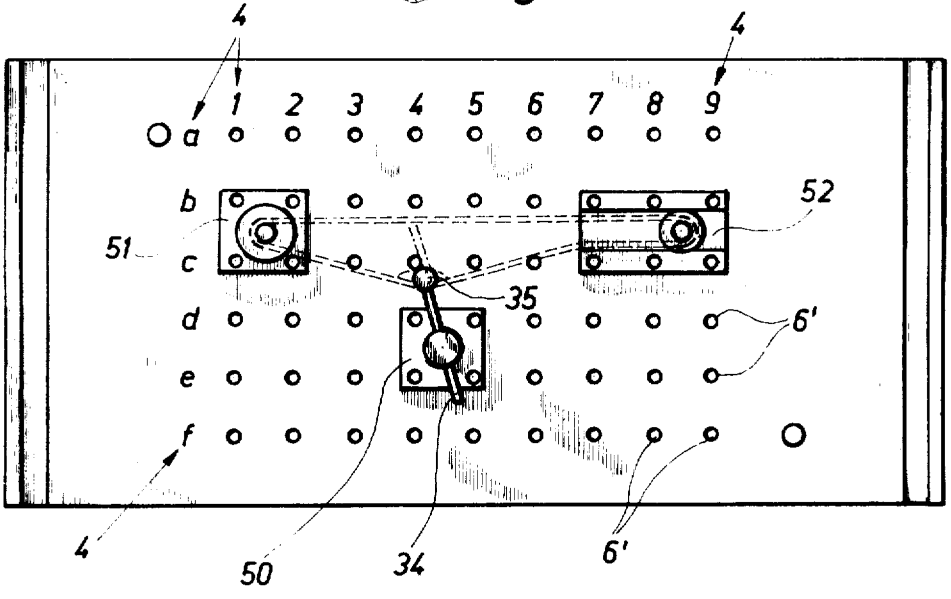
FIG. 30 is a top plan view of the system according to FIG. 28.

FIGS. 28 to 30 show an embodiment of the present invention in which the module units are fastened directly to a machine tool table 1′. For this purpose, the table is provided with threaded bores 6′ (see FIG. 29*a*) layed out in a locating hole system like that of FIG. 3. This embodiment permits the module units to be fastened directly to the machine tool table 1′ by means of suitable screws; otherwise it is the same as that of FIGS. 1 to 3.

Although the modules shown in FIGS. 14–27 are intended for use in tensioning the workpiece, it is to be understood that clamping units could also be used with the method of the present invention. This would merely require different workpiece retaining surfaces on the modules.

It will be understood that the above description of the present invention is susceptible to various modifications, changes and adaptations, and the same are intended to be comprehended within the meaning and range of equivalents of the appended claims.

I claim:

1. An apparatus for fabricating a holder for a workpiece comprising in combination:

a. layout means having a plurality of indicating means thereon forming a uniform rectangular grid representing a plurality of holes, said layout means having a predetermined size;

b. locating plate means having a plurality of bores therein forming a uniform rectangular grid which corresponds with the grid formed on said layout means, said plate means having a predetermined size;

c. at least one templet means having a size substantially less than the predetermined size of said layout means and a plurality of bores therein dimensioned relative to each other to correspond with the dimensioning of the indicating means forming the uniform rectangular grid on said layout means, so that said templet means can be located at a plurality of positions on said layout means; and d. at least one holding module means corresponding to said at least one templet means so that said module means can be located on said locating plate means in the bores corresponding to those represented on the rectangular grid of said layout means where said templet means is located.

2. An apparatus as defined in claim 1 wherein said module means has a size substantially less than the predetermined size of said plate means and includes a base plate defining a plurality of bores therein dimensioned relative to each other to correspond with the dimensioning of the bores forming the uniform rectangular grid on said locating plate means, so that said module means can be located at a plurality of positions on said plate means and a removable receiving stud means mounted on said base plate, and wherein said templet means has such a configuration that it represents said base plate and said stud.

3. An apparatus as defined in claim 2 wherein said at least one templet means defines an offset longitudinal slot, and further including an intermediate plate having at least one guide ledge and said removeable receiving stud means mounted on said intermediate plate at a location offset from one center line of said intermediate plate, said templet means which defines a longitudinal slot representing said module means with an offset receiving stud.

4. An apparatus as defined in claim 2 wherein said removably mounted receiving stud means is on said base plate for movement with respect thereto in two directions perpendicular to each other, and wherein said templet means defines an opening of rectangular configuration offset from one center line of said templet means so as to represent the two directions of movement of said stud means.

5. An apparatus as defined in claim 2, further including at least one intermediate sleeve arranged over said stud means and means fastened to said stud means to engage the workpiece.

6. An apparatus as defined in claim 2, further including bridge means including a height-adjustable support means attached at one end thereof, and wherein said stud means is pivotably mounted in the center of said base and defines a radial opening which engages said bridge means at a predetermined point along its length.

7. An apparatus as defined in claim 2 wherein said templet means has a plurality of triangular shaped sections so that it may be used to represent more than one different module means.

8. An apparatus as defined in claim 2 further including screw fastener means attaching said base plate to said locating plate means.

9. An apparatus as defined in claim 2, wherein at least one of said locating plate means and said at least one module means includes vacuum holding means.

10. An apparatus as defined in claim 1, wherein said plate means defines a plurality of bores spaced intermediate the bores of the uniform rectangular grid, wherein said at least one holding module means defines bores therein corresponding to said intermediate bores, and wherein said at least one templet means and said layout means have indications thereon corresponding to said intermediate bores.

11. An apparatus as defined in claim 1, wherein said locating plate means is an integral member of a machine tool.

* * * * *